US006347683B2

(12) United States Patent
Schriever

(10) Patent No.: US 6,347,683 B2
(45) Date of Patent: Feb. 19, 2002

(54) LOUDSPEAKER AND PROCESS FOR MANUFACTURING A LOUDSPEAKER

(76) Inventor: Siegfried Schriever, Strassburger Str. 226 A, 46045 Oberhausen (DE)

(*) Notice: Subject to any disclaimer, the term of this patent is extended or adjusted under 35 U.S.C. 154(b) by 0 days.

(21) Appl. No.: 09/866,047

(22) Filed: May 24, 2001

Related U.S. Application Data

(62) Division of application No. 09/380,903, filed as application No. PCT/DE98/00687 on Mar. 9, 1998.

(30) Foreign Application Priority Data

Mar. 12, 1997 (DE) ........................................ 197 11 982

(51) Int. Cl.[7] ........................ G10K 13/00; B29C 44/06

(52) U.S. Cl. ...................... 181/167; 264/46.4; 264/255

(58) Field of Search ................................ 181/167, 169, 181/171, 172, 173; 264/46.4, 46.5, 46.6, 45.5, 252, 255

(56) References Cited

U.S. PATENT DOCUMENTS

| | | | | | |
|---|---|---|---|---|---|
| 3,858,680 | A | * | 1/1975 | Tsuge et al. | 181/172 |
| 4,190,746 | A | * | 2/1980 | Harwood et al. | 181/167 |
| 5,293,009 | A | * | 3/1994 | Fleicher | 181/169 |
| 5,650,105 | A | * | 7/1997 | Yocum | 264/45.5 |
| 6,039,145 | A | * | 3/2000 | Ogura et al. | 181/169 |
| 6,183,674 | B1 | * | 2/2001 | Nonogaki | 264/46.4 |

* cited by examiner

*Primary Examiner*—Khanh Dang
(74) *Attorney, Agent, or Firm*—Fish & Associates, LLP; Robert D. Fish

(57) ABSTRACT

The loudspeaker comprises a cone (2) and a beading (4) attached to the cone (2). The beading (4) is composed of a sprayable plastic layer which is soft in its solid state. The manufacture of the loudspeaker is facilitated by a process in which an open negative mold (16) is used in which the cone (2) is arranged and immobilized. Following this, the plastic is sprayed into the open negative mold (16) and the beading (4) is formed as a soft plastic layer which attaches itself to the cone (2).

13 Claims, 1 Drawing Sheet

FIG. 1
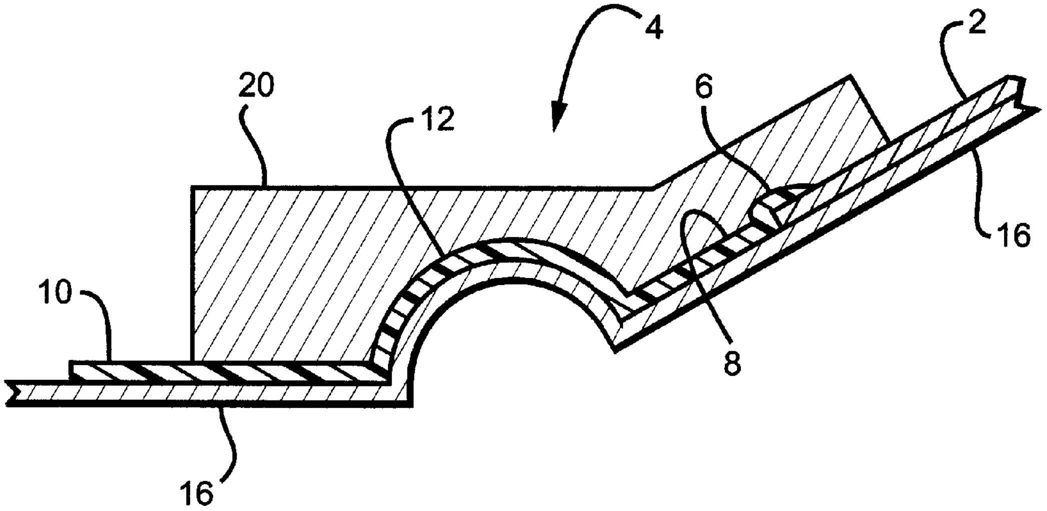
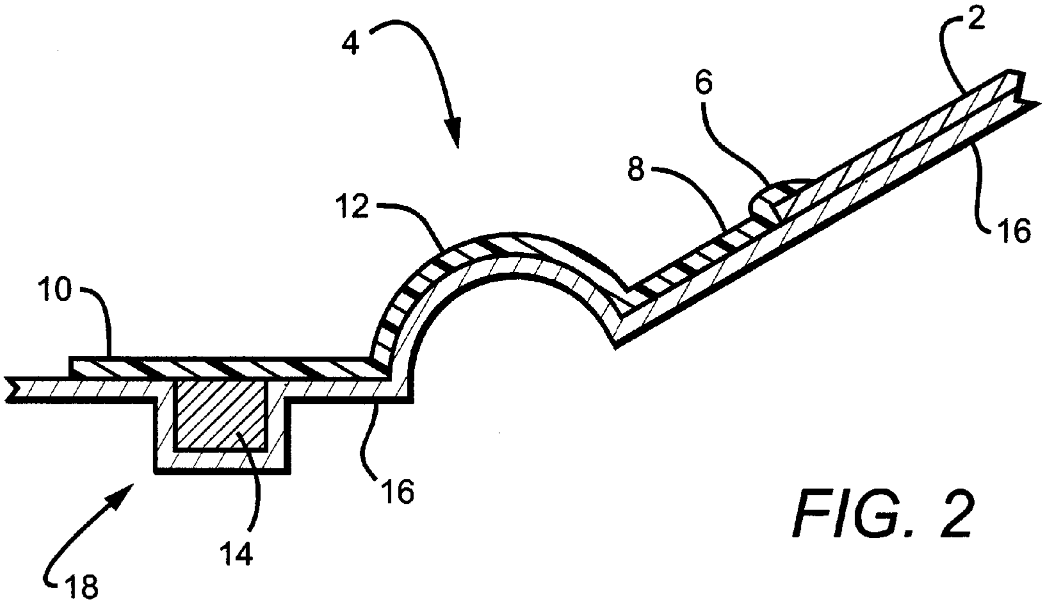
FIG. 2

LOUDSPEAKER AND PROCESS FOR MANUFACTURING A LOUDSPEAKER

This application is a division of U.S. application Ser. No. 09/380,903, filed Sep. 10, 1999, which is a 371 of PCT/DE98/00687, filed Mar. 9, 1998.

The invention relates to a loudspeaker with a cone and with a beading attached to the cone as well as to a process for manufacturing a loudspeaker.

Loudspeakers of the previously documented state of the art are dynamic loudspeakers in which a moving coil moves within the magnetic field of a permanent magnet in response to electrical signals. In this way, a cone attached to the coil is set into motion and generates soundwaves. The cone sets the surrounding air into a motion which most closely corresponds to the electrical signal and in which no audible vibrations due to the cone itself should be generated. The cone itself must exhibit a high degree of inner dampening. It is for this reason that the state of the art uses a fibrous paper mixture, polymer, metal foam or metal, preferably in a honeycomb structure, for the material of the cone.

In order that the cone can carry out its movement in as unimpeded a manner as possible, it is neccessary to attach the outer edge of the cone with a loudspeaker frame by means of a beading which holds the cone with the highest possible constant resilience in the predetermined direction of movement. Here, it is generally known that the beading is composed of rubber, foam or greased weaving.

EP 0 552 040 B1, upon which the present invention is based, discloses a loudspeaker with a cone composed of rigid polypropylene. The beading attached to the cone is on the other hand made of a soft polymer material, so that the different requirements of the rigidity of the cone material on the one hand and of the beading on the other are met. In the first step of the manufacture of this loudspeaker, the cone is placed or solidly clamped into the mold, followed by injection of elastomeric material into the mold. It is also disclosed that the cone is first manufactured by injection of a material made of polypropylene, followed by the manufacture of the beading by injection of elastomeric material.

A loudspeaker is also known from EP 0 632 674 A1, the cone of which is composed of polypropylene, and the beading and associated contact portion of which is composed of a thermoplastic synthetic resin. Dichromatic molding is employed in the manufacture, in the first step of which the polypropylene cone is manufactured in the mold. In the second process step, the beading and the contact portion with a seal are manufactured by injection of thermoplastic resin into the mold. During the curing of the materials, these parts join with one another at the attachment point provided so that a permanent attachment is formed.

Finally, a loudspeaker is known from EP 0 632 675 A1 in which both the cone as well as the beading are composed of woven materials, which however are treated by different amounts of a thermoplastic resin. This results in differing rigidities for the cone and the bead.

The loudspeakers described above in the state of the art have the disadvantage that the elastic properties of the materials used are only adjustable to a limited extent. For this reason, it is necessary that different materials be used for the cone and the bead. Furthermore, in the event that loudspeakers of varying specification are manufactured, it is not possible to use the same materials in the manufacture of the different loudspeakers. It is also disadvantageous in the manufacturing processes known from the state of the art that closed molds in which the material is injected have to be used for each process. These manufacturing processes have the further disadvantage that considerable waste is generated as a result of the excess material.

A process is known from EP 0 379 246 B1 for the manufacture and use of a sprayable polyurethane material. In this process, a polyurethane reaction mixture composed of two components is made which is sprayed onto the surface of a negative mold in order to make a film of uniform thickness. To this end, the spray gun comprises a nozzle for each component, out of which the respective components exit. The characteristics of the sprayed polyurethane layer can be variably tuned by setting the flowthrough amount of each of the components through its respective nozzle. In particular, the rigidity of the polyurethane film is amenable to adjustment within a wide range. The process described in EP 0 379 246 B1 facilitates in particular the manufacture of instrument panel components in auto manufacturing.

The underlying technical problem addressed by the present invention is to provide a loudspeaker and a process for the production of a loudspeaker, which avoid the disadvantages of the state of the art described above.

The technical problem described above is solved according to the invention by a cone with a beading attached to the cone, in which the beading is composed of a sprayable plastic layer which is soft in its solidified state. This offers the advantage that the elasticity of the beading can be very precisely adjusted to meet particular requirements. This is important because the elasticity requirement for the beading for a loudspeaker depends not only on the size of the loudspeaker but also on the amplitude at which the cone is to be able to move. In a first preferred embodiment, the plastic layer is composed of a thermoplastic material. However, if the layer is composed of a two-component reaction mixture as in a second preferred embodiment, the elasticity of the beading according to the invention can be very precisely tuned to the specific application by adjusting the amounts of the components in the polyurethane layer.

The beading preferably contains one or more of the materials polyurethane, polypropylene, polyvinylchloride or polyethylene.

Due to the purity of the types, the beading is preferably made of a polyurethane layer.

A further advantage of using the materials named above, especially polyurethane, is the fact that the beading made therefrom is watertight, allowing values of 50 mm WS and higher to be achieved. The loudspeaker can therefore be reliably used in locations where the danger of contact with moisture exists. As an example of such locations, car doors are hereby cited.

In a further preferred embodiment, the cone is composed of the same material as the beading—in the especially preferred embodiment a polyurethane layer—which, in contrast to the bead, is rigid, and which exhibits such sufficient stiffness as is needed to fulfill the requirements for sound generation by the loudspeaker. When both the cone as well as the beading are composed of a polyurethane layer, a further advantageous purity of type can therefore be achieved in the components of the loudspeaker, thereby simplifying any later disposal or recycling.

Furthermore, the manufacturing process described below ensures the formation of an integral attachment between the cone and the bead, thereby advantageously avoiding the need for glues.

A further advantage results from the provision of a seal attached to the bead, whereby an integral attachment between the beading and the seal is also preferentially provided.

The above mentioned underlying technical problem addressed by the invention is further solved by a process for the manufacture of a loudspeaker using an open negative mold which predetermines the shape of a loudspeaker composed of cone and bead. The cone, which can be made in advance and can be composed of known materials, is situated in the mold and is immobilized in its correct position. This is followed by the process according to the invention, in which a sprayable plastic is sprayed into the open negative mold, thereby forming a beading as a soft plastic layer which adheres to the cone. A thermoplastic plastic can be used. However, when a plastic composed of a two-component reaction mixture is used, the elasticity of the beading can be very precisely tuned to correspond to the shape, size and performance requirements of the loudspeaker by suitable choice of the mixture ratio of the two components. It is especially preferable that the plastic be composed of a two-component polyurethane reaction mixture.

In a preferred embodiment of the process according to the invention, the cone is similarly made of a polyurethane layer which is however of a higher rigidity than the beading described earlier. In the manufacture of the cone, a polyurethane reaction mixture consisting of two components is similarly sprayed into the open negative mold and is trimmed after curing. Preferably, the cone and the beading are made in this way in two subsequent process steps by spraying a polyurethane reaction mixture composed of two components in the same negative mold. Since the cone and the beading are accordingly made of essentially the same materials of only varying rigidity, a solid integral attachment is formed between the cone and the beading at the corresponding attachment point.

If the cone is made separately prior to the making of the bead, the cone can be situated and positioned in the negative mold both before as well as after the spraying of the polyurethane layer for the manufacture of the bead. In either case, a solid attachment between the cone and the beading is made during curing, eliminating the need to make a separate glue attachment.

A further improvement of the process according to the invention is achieved by the setting of a sealing ring into a recess provided in the negative mold prior to spraying the polyurethane layer for the manufacture of the bead. If the polyurethane layer is sprayed onto the negative mold as well as onto the side of the sealing ring facing the open side of the negative mold, then a solid attachment is formed between the beading and the sealing ring during curing of the polyurethane layer. The use of a glue can be avoided here as well.

Preferably, the process according to the invention is further simplified by the use of rotationally symmetric negative molds, in that the negative mold is rotated during the spraying of the polyurethane layer and that the spray head carries out an essentially linear movement. Uniformity of application of the polyurethane layer can be ensured by means of a suitable synchronization between the rotational movement and the linear movement, so that the most uniform polyurethane layer possible results.

The maintenance of a predetermined layer thickness is further achieved by the use of a countermold matched to the negative mold which is applied to the polyurethane layer following spraying in order to yield a precisely defined thickness in the polyurethane layer. In this way, the polyurethane layer, which is still fluid following spraying, is trapped between the negative mold and the countermold, which exhibit a predetermined separation from one another. Following curing, a polyurethane layer with a precisely defined thickness is formed.

So that the countermold and the negative mold can each be removed from the manufactured polyurethane layer, it is advantageous to coat those sides of the countermold and the negative mold which face towards the polyurethane layer with a non-stick agent.

The amount of non-stick agent can be reduced or, in the case of the negative mold, the use of a non-stick agent can be avoided altogether, if apertures are provided in the negative mold, through which pressurized air can be fed to simplify the freeing from the mold. In this way, one can particularly guarantee that there is no non-stick agent present in the regions where the formation of an attachment of the polyurethane layer with a seal positioned in a recess of the negative mold is intended, which could otherwise impede such an attachment.

The invention will be described in detail below in connection with preferred embodiments with reference to the drawing. The drawing shows:

FIG. 1 a beading attached to a cone which is manufactured on a negative mold, and whose layer thickness is dictated by the application of a countermold, and FIG. 2 a second preferred embodiment of a beading attached to a cone, in which the beading is attached on its outer edge to a seal situated in the negative mold.

In FIGS. 1 and 2 of the drawing a loudspeaker is shown which consists of a cone 2 and a beading 4 attached to the cone 2. The beading can be inwardly curved as shown in the embodiment. The invention is, of course, not restricted to loudspeakers with beads shaped in such a way. Rather, beads of the most diverse shapes can be manufactured by the process according to the invention. The beading 4 and the cone 2 are attached to one another at their flush edges through an attachment point 6. This attachment point 6 is located on the inner edge of the beading 4. In addition, the beading 4 comprises a cone-shaped portion 8 which is essentially facing the surface of the cone 2. The beading further comprises an outer ring-shaped portion 10 which serves to attach the unit of the beading 4 and the cone 2 with the loudspeaker frame (not shown). In the application of the process according to the invention, this portion 10 can be kept free of non-stick agents and can thus be securely glued to the frame without further preparation. The cone-shaped portion 8 and the ring-shaped portion 10 of the beading 4 are joined with one another through a ring-shaped portion 12 which forms a curve, and which constitutes the actual bead. This elastic portion 12 or the beading enables a relative movement of the cone 2 with respect to the fixed ring-shaped portion 10, whereby the elastic characteristics of the ring-shaped portion 12 are chosen such that the vibrational characteristics of the cone 2 are only negligibly influenced.

In the embodiment shown in the drawing of a loudspeaker according to the invention, the beading 4 is made of a soft polyurethane layer. This offers the advantage that the elastic characteristics of the beading can be very precisely adjusted by the mixture proportion of the polyurethane components.

Normally the cone is made of a rigid material, for example cardboard, a metal or polypropylene, whereby the rigidity of the material lies within a fixed range. In the embodiments shown in FIGS. 1 and 2, the cone 2, like the beading 4, is made of a polyurethane, whereby the mixture proportion of the components is chosen during the manufacture of the polyurethane cone 2 such that a more rigid polyurethane layer results than in the beading 4. This results in the cone 2 as well as the beading 4 consisting of essentially the same material, differing only in their intrinsic rigidity with respect to one another.

As shown in FIGS. 1 and 2, the beading 4 and the cone 2 overlap one another at the attachment point 6, and the cone 2 is integrally attached to the beading 4. The integral attachment is formed in the manufacturing process further described below. The integral attachment has the advantage that no additional glue is required for the attachment of the beading 4 to the cone 2. When both the cone 2 and the beading 4 are additionally made of a polyurethane layer, an integral attachment results which has the further advantage that the attachment is very reliable, since, as a result of the same basis materials, a very good crosslinking can form at the interfacial layer between the beading 4 and the cone 2. Furthermore, the cone 2 and the beading 4 exhibit approximately the same thermal properties, so that temperature fluctuations to which the loudspeaker is subjected do not lead to strain at the attachment point 6 between the cone 2 and the beading 4.

As shown in FIG. 2, a seal 14 is provided which is fixed to the the outer ring-shaped portion 10. As described below, it is by way of this that an integral attachment between the seal 14 and the beading 4 is formed in that the polyurethane layer of the beading 4 is directly applied to the surface of the seal 14. The use of additional glue is avoided here as well, and an extremely reliable attachment between the beading 4 and the seal 14 is achieved.

The following describes the process according to the invention for the manufacture of a loudspeaker. In the process, an open negative mold 16 is used which dictates the shape of the loudspeaker conprising a cone 2 and a beading 4. First, the cone 2 is arranged in the negative mold 16 and is immobilized in its exact position. Following this, a polyurethane reaction mixture consisting of two components is sprayed into the open negative mold 16 so that a beading 4 is formed which is attached to the outer edge of the cone 2. By suitably setting the mixture proportion of the polyurethane reaction mixture components, the beading 4 exhibits a high elasticity; in other words, the beading 4 is made of a soft polyurethane layer. For spraying the polyurethane reaction mixture, both of the components are heated to a temperature at which the components are free-flowing and, with the help of a spraying gun, can be sprayed onto the negative mold. In order to achieve as uniform a distribution and as uniform a curing as possible, the negative mold 16 is also heated so that, following spraying, the polyurethane layer and the negative mold 16 cool down together to effect the desired uniform curing process. During this curing process, the beading 4 becomes attached to the surface of the cone 2 at the attachment point 6, leading to the formation of an integral attachment between the beading 4 and the cone 2.

In a further embodiment of the process according to the invention, the cone 2 is also formed as a polyurethane layer by the spraying of a polyurethane reaction mixture consisting of two components into the open negative mold 16. In contrast to the manufacture of the beading 4, the mixture proportion of the two polyurethane components is chosen in the manufacture of the cone 2 such that a rigid polyurethane layer is formed which conforms to the demands on the vibrational behavior of the cone 2.

As previously described, if the cone 2 is, like the beading 4, also made of a polyurethane layer, it is advantageous that the cone 2 and the beading 4 be manufactured in two subsequent steps by the spraying of a polyurethane reaction mixture consisting of two components into the same negative mold. This has the advantage that the process for the manufacture of a loudspeaker has few coordinated process steps, and can therefore be performed easily and economically.

A further simplification of the process for the manufacture of a loudspeaker arises from the fact that a seal 14 shaped as a sealing ring is placed in a recess 18 provided in the negative mold 16 prior to the spraying of the polyurethane layer of the beading 4. The surface of the seal 14, which is directed to the open side of the negative mold 16, is covered by the polyurethane layer during the spraying of the polyurethane. During the curing of the polyurethane, a solid, integral attachment between the beading 4 and the seal 14 is then formed so that the use of an additional glue for attaching the seal 14 and the beading 4 can advantageously be avoided. In the attachment of the loudspeaker with the beading 4 to the loudspeaker frame (not shown), the seal 14 then serves to seal off the opening in the loudspeaker housing to the inside of the housing in order to prevent the entry of dirt or moisture.

In a further embodiment of the process according to the invention, a rotationally symmetric negative mold 16 is rotated during the spraying of the polyurethane layer so that it is only necessary to drive the spray head (not shown) in an essentially linear movement. Uniform spraying of the polyurethane layer onto the negative mold is achieved by moving the spray head back and forth between the end positions while rotating the negative mold 16.

Furthermore, as shown in FIG. 1, a countermold 20 is applied to the polyurethane layer after spraying in order to achieve, after curing, a precisely defined thickness in the polyurethane layer. The countermold extends along the outer segment of the cone 2 over the attachment point 6, along the cone-shaped portion 8, the ring-shaped portion 12 and along a segment of the ring-shaped portion 10 of the beading 4. Following curing of the polyurethane layer, the latter exhibits a precisely predetermined thickness which is dictated by the separation between the negative mold 16 and the countermold 20.

The countermold 20 is composed of a suitable material with a smooth surface, for example Teflon or silicone rubber. Furthermore, the surface of the countermold 20 is provided with a non-stick agent in order to enable easy detachment of the countermold 20 from the cured polyurethane layer, and in order to avoid even the least degree of binding between the sprayed polyurethane layer and the countermold. The non-stick agent then forms an interfacial layer between the sprayed polyurethane layer and the surface of the countermold 20. The negative mold 16 can be provided with a non-stick agent in the same way.

As described above, the countermold 20 extends over only a short segment along the ring-shaped portion 10 of the beading 4 so that the outer region of the ring-shaped portion 10 is covered by the countermold 20. In this way, the outer region of the ring-shaped portion remains free of non-stick agent so that it is still possible to glue the beading 4 in this region to the loudspeaker frame or to other parts of the loudspeaker without first having to remove the non-stick agent. This also contributes to a simplification in the manufacture of the loudspeaker, as an additional process step for the removal of the non-stick agent at the gluing point is avoided.

Following curing of the sprayed polyurethane layer for the manufacture of the beading 4 and, as the case may be, for the manufacture of the cone 2, it is finally necessary to cut off the outer edge of the ring-shaped portion 10 of the beading 4. In the process according to the invention, this trimming procedure is carried out in the negative mold 16 with a knife, preferably with a circular knife. For this reason, it is unnecessary to arrange the loudspeaker part consisting of the cone 2 and the beading 4 in a separate mold and carry out a trimming procedure. In the process according to the invention, the entire manufacture of the loudspeaker part consisting of the cone 2 and the beading 4 therefore takes place completely within the negative mold 16.

The process according to the invention for the manufacture of a loudspeaker therefore advantageously entails only a small number of process steps, since separate process steps for the gluing of the seal 14 to the beading 4 as well as of the beading to the cone 2 are obviated. Tool costs are also saved since the entire manufacturing process takes place in the negative mold 16. In comparison to beads manufactured by the foam stamping process, a considerable saving of material is also achieved.

LIST OF REFERENCE NUMBERS

2 cone
4 bead
6 attachment point
8 cone-shaped portion
10 ring-shaped portion
12 ring-shaped portion
14 seal
16 negative mold
18 recess
20 countermold

What is claimed is:

1. A method of manufacturing a loudspeaker, comprising:

providing an open negative mold;

placing a cone into the open negative mold;

immobilizing the cone at least temporarily in the open negative mold, and spraying a plastic into the mold to produce an elastic plastic layer, wherein the elastic plastic layer forms a beading, and wherein the beading attaches to the cone; and coupling a seal to the beading.

2. The method of claim 1 wherein the plastic comprises a thermoplastic.

3. The method of claim 1 wherein the plastic is fabricated from a reaction mixture of at least two components.

4. The method of claim 3 wherein the plastic comprises at least one material selected from the group consisting of a polyurethane, a polypropylene, a polyvinyl chloride, and a polyethylene.

5. The method of claim 1, wherein the cone is manufactured as a rigid polyurethane layer by spraying a reaction mixture comprising at least two components into the open negative mold.

6. The method of claim 5 wherein the cone and the beading are manufactured in two subsequent process steps, wherein the cone and the beading are produced in the same open negative mold by spraying a polyurethane reaction mixture comprising at least two components into the open negative mold.

7. The method of claim 1 wherein the seal is placed into a recess in the open negative mold prior to spraying the plastic.

8. The method of claim 1 wherein the open negative mold is a rotationally symmetric open negative mold.

9. The method of claim 8 wherein the open negative mold is rotated during the spraying, and a spray head performs a substantially linear movement.

10. The method of claim 1, further comprising applying a counter mold subsequent to the spraying of the plastic.

11. The method of claim 10 wherein at least a portion of an outer edge of the beading is not covered by the counter mold.

12. The method of claim 1 wherein the open negative mold comprises a plurality of apertures, and wherein pressurized air fed through the plurality of apertures assists in release of at least one of the beading and the cone from the open negative mold.

13. The method of claim 1 wherein the beading is trimmed in the open negative mold with a knife.

* * * * *